Patented Oct. 7, 1930

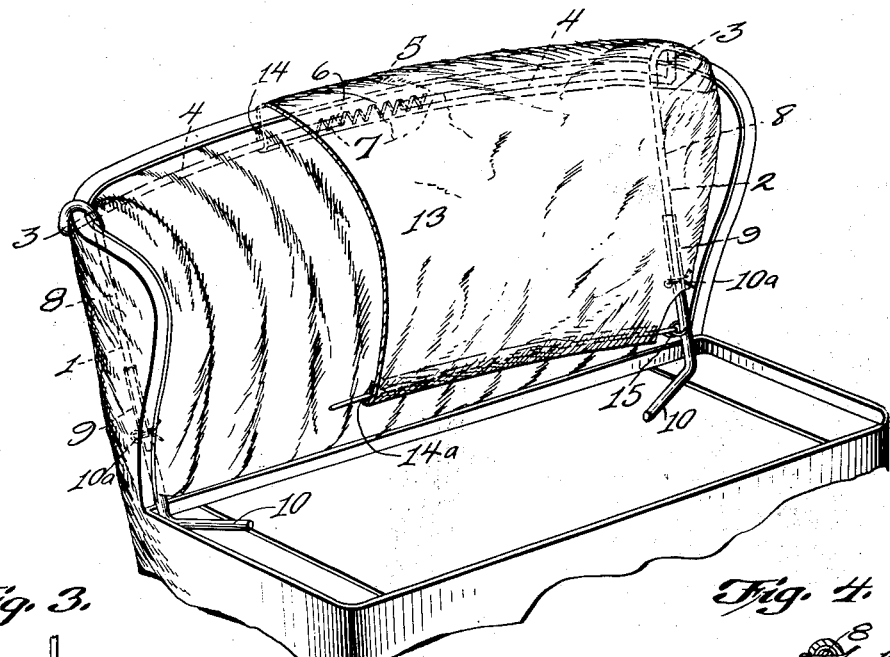
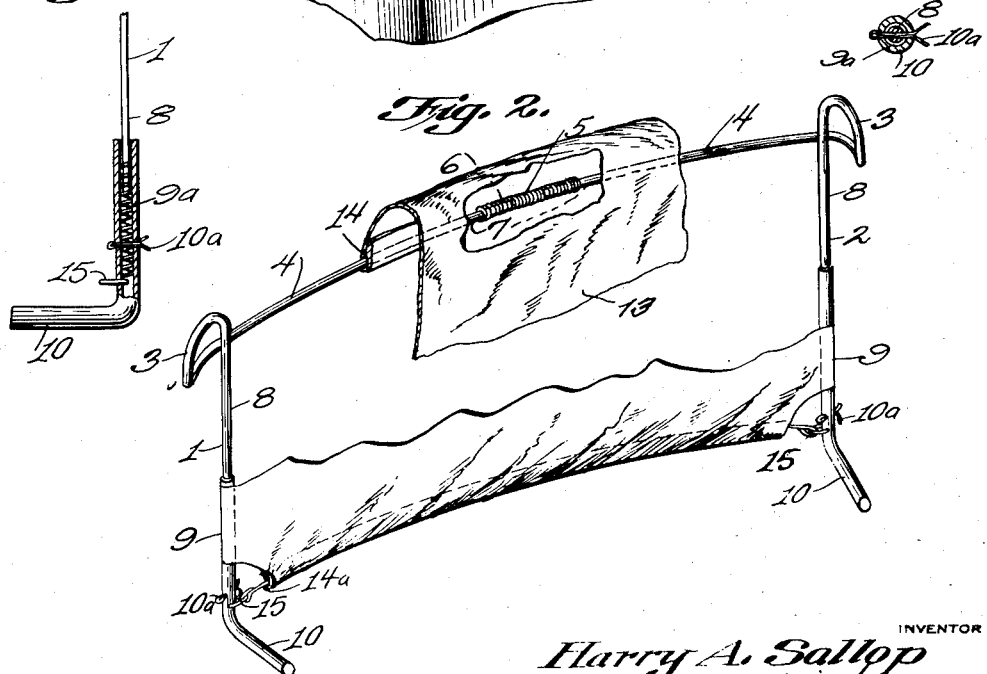

1,777,451

UNITED STATES PATENT OFFICE

HARRY A. SALLOP, OF NEW YORK, N. Y.

REMOVABLE AUTOMOBILE SEAT COVER

Application filed August 31, 1929. Serial No. 389,636.

This invention relates to automobile seat covers and has for its primary object the provision of seat covers that may be more quickly and effectively applied to automobile seats and in a manner that securing elements directly mounted in the body of the structure of the automobile are dispensed with.

An object of the invention is a construction of seat cover that may be effectively applied to a seat by an inexperienced person, due to the fact that the design of the supporting means of the seat cover is such that the same will automatically move into required position in the application of the seat cover.

Another object of the invention is the design of an attaching frame that will accommodate variations in size and contour of automobile seats so as to provide a universal type of cover adaptable to all makes of automobile.

A feature of the invention resides in the construction of a seat cover that has a direct interlocking connection with the seat structure, without the use of attaching elements and so cooperative with the seat structure that the effective grip between the cover and the seat structure is increased proportionately to the strains to which the seat cover is subject in the use thereof.

Besides the above my invention is distinguished in the use of an extensible frame so constructed that the same will have interlocking engagement with the top portion of the seat, the side portions of the seat and the bottom portion of the seat, thereby assuring a rigid connection and one that will assure a taut arrangement of the cover section over the upholstery of the seat.

Another feature of the invention resides in the use of a collapsible frame for minimizing space during shipment and further enable quick detachment of the frame from the cover section when it is necessary to clean the latter.

An object of the invention is the utilization of flexible connections between component parts whereby the seat cover may automatically adjust itself to slight variation in size and contour of various types of automobile seats thereby accomplishing a neat taut arrangement of the seat cover over the seat structure.

Another object of the invention is the novel manner of interconnecting the various members of the attaching frame which will enable the frame to be shipped concealed within the cover section, due to the fact that the frame may be folded upon itself for accomplishing a neat packing of the covers.

With these and other objects in view, the invention will be better understood by the following detailed description taken in connection with the drawings wherein:

Figure 1 is a perspective view partly in section of a seat cover construction according to my invention, Figure 2 is a perspective view of the supporting frame removed from the cover section, Figure 3 is an enlarged detailed sectional view of the connection between the side bars, Figure 4 is a horizontal sectional view through one of the side bars.

The present invention, a continuation in part of my copending application, filed August 31, 1929, Serial No. 389,635 illustrates my invention designed for an automatic take up connection with an automobile seat structure irrespective of the contour or size thereof. This desired objective is accomplished by interposing yieldable connections at required points for allowing component parts to be moved toward and away from each other for accommodating adjustments necessary in the development of a universal seat cover adaptable to the various types of automobile seat structures now on the market.

Referring to the drawing, the numerals 1 and 2 designate a pair of side bars provided with hook portions 3, engageable over the upper edge portion of the seat and terminating into elongated extensions 4 that conform to and rest directly in contact with the rear surface of the automobile seat back. The extremities of the extensions 4 are brought into close proximity with each other and are directly connected by a flexible connector 5 which may have yieldable characteristics accomplished by providing a short length of coil spring 6 to the ends 7 of which are directly attached the ends of the extensions. With this novel form of connection, the side bars are free to move toward and away from each other with the additional advantage that one side bar may be folded in parallel relation with the other bar for producing a neater shipping package and minimizing space. Due to the formation of the hook portions and the novel inter-locking engagement with the back of the automobile seat, it will be appreciated that the connector 5 automatically functions at all times to draw the hook portions 3 into snug tight engagement with the seat structure, and further enables compensation for slight variations in size and contour of seat structures.

I have also improved the side bars to the extent of forming each of the bars of a pair of companion sections hereinafter known as an upper section 8 and a lower section 9, the former a continuation of the hook portion 3 and the latter in a form of a tube slidably receiving the upper section 8 and further terminating in a foot 10 adapted to engage under the bottom cushion of the seat structure. The upper section 8 has directly attached thereto one end of a coil spring 9$^a$, the other end adapted to be secured to the lower section through the use of a cotter pin 10 after the upper section 8 and the spring has been slid within the lower section. Thus it will be appreciated that I have provided a very simplified type of connection and one that has yieldable properties so as to enable the side bar to be extended or contracted to accommodate slight variations in height of the various types of seat structures now in use. To complete the invention I provide a cover section 13 having a seam 14 receiving directly therein the guide bars and the connector 5, so that when the frame is snapped over the seat structure the cover will be automatically drawn taut across the irregular surface of the seat structure and to facilitate this action, I arrange a draw string 14 at the lower curved edge portion of the cover section and tied to the side bars as indicated at 15.

From the foregoing description taken in connection with the accompanying drawing it will be appreciated that I have designed a novel type of seat cover in which the supporting frame is constructed of component parts leaving a permanent connection with each other but capable of adjustable movements in horizontal and vertical directions to enable the frame to adapt itself to slight variations in width, height, and contour of various types of seat structures now in use. It will also be appreciated that owing to the yieldable connection between component parts, the frame is capable of yieldable movement in various directions to automatically take up slack and adjustments and assure proper connection between the supporting frame and the seat structure. As the frame may be neatly folded upon itself, the cover section may be directly attached to the frame in the shipment thereof which greatly facilitates the ease with which the article may be quickly applied to a seat structure by an unskilled person. It requires very little effort to remove the frame from the seam of the cover section, as the design and co-relation of the component parts of the frame are such as to allow the same to readily conform to the design of seam necessary with the form of seat cover section utilized.

Due to the yieldable action of the springs 9$^a$, and the spring 6, it will be appreciated that there is a yieldable pull in various directions to secure the proper interlocking engagement between the hook portions 3 and the seat structure, so to positively prevent displacement of component parts.

It is of course to be understood that the supporting frame may be constructed in various other manner than illustrated and various forms of connections may be utilized to accommodate the proper adjustment of the various parts, and therefore I do not desire to be limited in protection in any manner whatsoever except as set forth in the following claims.

What I claim is:

1. An automobile seat cover comprising an upright frame adapted for resilient adjustments horizontally and vertically, and a cover section attached thereto.

2. An automobile seat cover comprising side bars adapted to have interlocking engagement with an automobile seat structure, a resiliently extensible connector between the side bars and a cover section attached to and concealing said bars and said connectors.

3. Automobile seat cover comprising a supporting frame including side bars yieldably connected together and each capable of yieldable extensible movements and a cover section directly attached to said frame.

4. An automobile seat cover comprising side bars adapted to have interlocking engagement with the top portion of the automobile seat structure, a yieldable connection between said side bars and extensible sections yieldably connected to said side bars and adapted to have interlocking engagement with spaced portions of the automobile seat structure, and a cover section removably mounted on said side bars.

5. An automobile seat cover comprising bars connected together for resilient movements toward and away from each other in a horizontal direction, said bars being capable of resilient extensible movements in a vertical direction, and a cover section directly mounted on said bars.

6. An automobile seat cover comprising a frame including side bars, means normally tending to draw the side bars toward each other, means for normally contracting the size of said side bars and a cover section removably mounted on said side bars.

7. An automobile seat cover comprising a frame for connection to the back of an automobile seat and automatically contractible in a plurality of directions to accommodate automobile seats of a different height and different width, and a cover section directly attached thereto.

8. An automobile seat cover comprising side bars for attachment to an automobile seat structure and including slidably related sections, springs interposed between said sections, a spring directly connecting the side bars together, and a cover section removably mounted on said side bars.

9. An automobile seat cover comprising side bars for attachment to an automobile seat structure and including slidably related sections, springs interposed between said sections, a spring directly connecting the side bars together, a cover section removably mounted on said side bars, and a draw string for drawing the cover section taut over a seat structure and attaching the cover section in fixed relation with said side bars.

10. An automobile seat cover comprising a frame for adaptation to an automobile seat back and having a resiliently extensible intermediate portion and resilient extensible end portions and a cover section removably connected to said frame.

In witness whereof I have hereunto set my hand.

HARRY A. SALLOP.